(12) United States Patent
Tiedeman

(10) Patent No.: US 7,716,105 B1
(45) Date of Patent: May 11, 2010

(54) BROKERAGE MANAGEMENT SYSTEM AND METHOD

(75) Inventor: Curt Tiedeman, Bellevue, WA (US)

(73) Assignee: Benefit IQ, L.L.C., Bellevue, WA (US)

( * ) Notice: Subject to any disclaimer, the term of this patent is extended or adjusted under 35 U.S.C. 154(b) by 413 days.

(21) Appl. No.: 11/460,967

(22) Filed: Jul. 28, 2006

(51) Int. Cl.
*G06Q 40/00* (2006.01)

(52) U.S. Cl. .............................. 705/36; 705/37; 705/35

(58) Field of Classification Search ............... 705/36 R, 705/35–45, 10, 14; 707/100–104; 235/379–380
See application file for complete search history.

(56) References Cited

U.S. PATENT DOCUMENTS

| | | | |
|---|---|---|---|
| 5,819,263 | A | 10/1998 | Bromley et al. |
| 5,855,008 | A | 12/1998 | Goldhaber et al. |
| 6,064,986 | A | 5/2000 | Edelman |
| 6,385,594 | B1 | 5/2002 | Lebda et al. |
| 6,505,166 | B1 | 1/2003 | Stephanou |
| 6,883,002 | B2 | 4/2005 | Faudman |
| 6,970,835 | B1 | 11/2005 | Forward |
| 7,039,594 | B1 | 5/2006 | Gersting |
| 7,305,347 | B1* | 12/2007 | Joao ............................... 705/1 |
| 7,406,441 | B2* | 7/2008 | Kimura et al. ................. 705/26 |
| 2001/0051906 | A1* | 12/2001 | Esposito ...................... 705/35 |
| 2002/0077873 | A1* | 6/2002 | Clarke ........................... 705/7 |
| 2002/0128879 | A1* | 9/2002 | Spears .......................... 705/4 |
| 2002/0149616 | A1* | 10/2002 | Gross et al. .................. 345/745 |
| 2003/0055691 | A1* | 3/2003 | Cooper et al. .................... 705/7 |
| 2003/0093283 | A1* | 5/2003 | Morsa ........................... 705/1 |
| 2003/0229522 | A1* | 12/2003 | Thompson et al. ............. 705/4 |
| 2004/0172268 | A1* | 9/2004 | Franklin et al. ................. 705/1 |
| 2005/0251428 | A1* | 11/2005 | Dust et al. ...................... 705/4 |
| 2006/0064313 | A1* | 3/2006 | Steinbarth et al. .............. 705/1 |
| 2006/0085408 | A1* | 4/2006 | Morsa ........................... 707/3 |
| 2006/0200537 | A1* | 9/2006 | Kimura et al. .............. 709/219 |
| 2007/0198339 | A1* | 8/2007 | Shen et al. ..................... 705/14 |
| 2009/0276249 | A1* | 11/2009 | Dust et al. ...................... 705/4 |

OTHER PUBLICATIONS

Glenn Setzer, Affinity Programs with Some Charity Begins at Home, Apr. 6, 2005, MND News Daily (Affinity).*
Realogy-13 http://www.realogy.com/b2b/corporations/cartus/.*

* cited by examiner

*Primary Examiner*—James P Trammell
*Assistant Examiner*—Chika Ojiaku
(74) *Attorney, Agent, or Firm*—Jellet Law Firm, P.S.

(57) ABSTRACT

What is provided is a system and method for providing a benefit package. In order to provide the benefit package, a professional utilizes a subscriber application which is configured for the professional's given set of services. The professional establishes an arrangement with a large entity. The professional then establishes a provider account on behalf of the large entity. Through this provider account, the benefit package is generated for the employees and individuals associated with the large entity. The employees benefit from the employment relationship by taking advantage of the benefit package negotiated by the employer on their behalf.

22 Claims, 15 Drawing Sheets

BROKERAGE MANAGEMENT SYSTEM AND METHOD

BACKGROUND OF THE INVENTION a) Field of the Invention

The field of the current embodiments generally relates to professional services and providing professional services to organizations such as companies, unions, educational groups, governmental agencies, nongovernmental agencies, and the individual members employed or associated with those organizations.

b) Background Art

U.S. Pat. No. 5,819,263 discloses a financial planning system incorporating relationship and group management, where an adviser can provide proactive, efficient service to clients through the use of the group management system. The system is an effective work management tool that efficiently organizes and advises day-to-day operations, workflow, clients and prospects. This is done by allowing coordinated consultation based not only on an individual's demographic information, but also on the individual's relationship to others, people and organizations which are arranged into client groups and prospect groups. An adviser can analyze an individual's relationship with his or her family, business and pension to provide overall financial planning and security. As seen in col. 4 around line 55, in the summary of the invention section, "To achieve financial security, the system considers the client's account information in conjunction with the client's goals. The grouping of clients by specific criteria greatly enhances an advisor's ability to assist clients in achieving their relationship goals."

U.S. Pat. No. 5,855,008 discloses an attention brokerage, which provides an approach for distributing advertising and other information over a computer network. As seen in the abstract, "Attention brokerage is the business of buying and selling the attention of consumers." It can be used to provide direct, immediate payment to a consumer for paying attention to an advertisement or other information.

U.S. Pat. No. 6,064,986 discloses a computer-assisted and/or implemented process and architecture for customer account creation, maintenance and administration of foreign investment and/or retirement program. The process includes receiving a request from a customer to administer the resources in accordance with predetermined criteria, storing customer related data associated with the customer. A network of service providers is formed to assist in the administration of the resource for the customer and to provide a variety of economic and/or administrative features using a computer. As is seen in the summary of the invention section, "It is another feature and advantage of the present invention in providing a process of, opening, managing and/or administering a customer account for administration of retirement and/or administrative resources in conjunction with a predetermined configuration network service providers, thus reducing costs and optimizing or maximizing return and/or investment resources while attempting to minimize administration costs."

U.S. Pat. No. 6,385,594 discloses a method and computer network for coordinating a loan over the internet. The invention relates to a method and a computer for coordinating an electronic credit qualification form between an Internet user and a plurality of lending institutions via the Internet. This method involves displaying documents in a web site, and receiving credit data from forms placed on the web site. After receiving this data a special loan processing computer applies a filter to the data. The filter comprises loan selection criteria provided by lending institutions which allows these institutions to filter out loan applications that they do not want. Next, after the data is filtered, it is transmitted to a plurality of lending institutions. Finally, the computer and the method then controls and coordinates communication between these lending institutions and the Internet user to match borrowers and lenders via the Internet. As can be seen in the summary of the invention section, "it is therefore an object of the present invention to provide a fast, convenient process to apply for credit from a large number of lending institutions. In accordance with our invention, needless repetitive applications or credit qualification form are eliminated."

U.S. Pat. No. 6,505,166 discloses a system and method for providing expert referral over a network, the system allows users to request assistance over the Internet to an expert server having a file of qualified experts. The first expert to respond to the request is assigned an alias and is enabled to communicate with the requester through the expert server. According to the background portion of the invention, "A key aspect of the present invention is that the system is adaptive. If an expert who is lower on the priority list continues to get high grades from customers for accomplishing tasks, that expert can climb in the rankings and achieve a priority ranking thereby receiving more request for assistance and hence, more revenue from responding to customers needs."

U.S. Pat. No. 6,883,002 discloses a real estate information exchange process and system, the system is connected to a database of MLS properties. Real estate agents subscribe to the system and are included in the database. Clients to the system are either prospective buyers or MLS properties. Each client utilizes a subscribing real estate agent to represent them before being allowed access to the information and services provided. Real estate agents may view any of the client files and activities and post MLS properties for sale. Agents are also able to view the activity of their own listings. According to the objects section in col. 4 around line 29, "Another object of the invention is to provide a real estate information exchange process and system that can provide an activity report that informs the listing agent of the amount as well as the source of activity regarding the names of other agents who have looked at the listing agent's property." Also, still in col. 4 around line 18, "it is an object of the present invention to provide a real estate information exchange process and system that includes a database accessible over the Internet or an Intranet that allows exchange of information between agent to agent and also between agent to client".

U.S. Pat. No. 6,970,835 discloses a system and method for directing and instructing customers to deal with specific merchants, the system uses incentives to verify commissions from matching a buyer with a seller. An item locator system has a repository of information, about items for purchase, and may be provided over network for users to access the information about the items. Along with each item, the system presents an incentive that may be realized if the item is purchased from a designated third-party seller. The user then executes the purchase with the seller, pays the system the agreed-upon fee and also issues a certification of purchaser to the buyer. The fee or commission may be based on the price of the item; such as if the item is a new house for sale and the seller is a new house builder. This can be seen in col. 2 around line 29, "Another object of the invention is to provide a new business method for eliminating agent's commissions in the sale of items through the use of a central system for bringing together buyers and sellers of items." Still in col. 2 around line 58, "the present invention may comprise a method relating to the sale of new houses through a web site accessible by potential buyers over the Internet."

U.S. Pat. No. 7,039,594 discloses a method and system for content management assessment, planning and delivery, where the method using key considerations related to the client environment, and using key processes, and applying these to the design problem with the assistance of a template showing basic content management and delivery element relationships, whereby such a system can be implemented wherein coherent sales, training or marketing campaigns may be efficiently generated to web-based and other clients.

www.CTXmort.com: this web site discloses on the homepage what appears to be the standard consumer application for purchasing and refinancing home loans. There also seems to be insurance quotes, realtor associations, and affiliated business arrangements. On the affiliated business arrangement link, the arrangement is a limited partnership established between two entities, a mortgage lender and the other entity being the homebuilder, a realtor, a bank, credit union, corporate affiliation, or other business arrangement which provides opportunities of ownership but limits risk. One of the benefits according to the web site is "increased profit margin such as participating in mortgage company profits, selling inventory, or enforcement of upgrade options, additional outside business referrals, etc. One of the options that the system provides to its mortgage brokers is personal web sites with newsletters which are generated to keep the mortgage brokers clients up-to-date."

http://www.ditech.com/about/sitemap.html discloses what seems to be a consumer oriented home loan web site. This site focuses on new purchases, refinance, and home equity products. In the new purchases section, the site provides product solutions, rates and fees, and calculators for new home loans. The site also provides construction loans and an overview for information on construction loans. In the refinance section, the same categories are provided including product solutions, rates and fees, and calculators. In the home equity section, again products are provided, information on HELOCS and HELOANS are provided, various calculators and research for different types of home equity loans. In addition to the product sections, the site also provides a learning center including video library; the learning center also has tax information. A local pages link provides a list of local offices within various states. Each user of the site can set up an account for applications of various types of loans and provide their own specific personal profile. As seen on the back page, "Ditech.com, a national direct mortgage lender, offers some of the most competitive rates and fees available on first mortgages and home equity loans. Deal direct and get the right home loan for you without paying a commission or a broker fee to a middleman. The whole process is fast and easy."

DESCRIPTION OF THE CURRENT EMBODIMENTS

Figure 1:
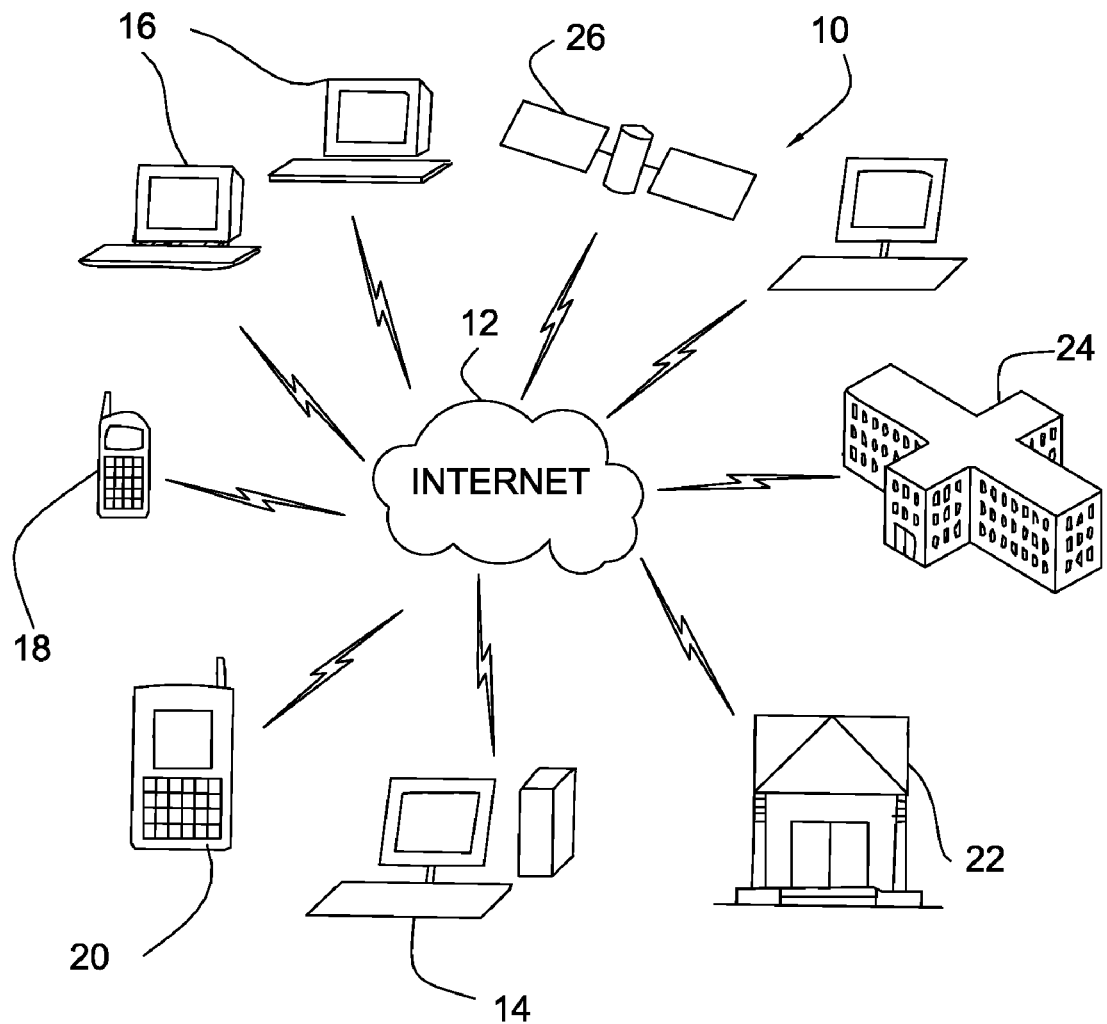
FIG. 1 is a schematic diagram of the system to provide a real estate benefit package.

Generally speaking, the present embodiment enables a subscriber to team up with professional partners and provide to a company, employer, large group, association, Union, governmental agency, nongovernmental agency, educational institution or any other provider of a benefit package, a customized professional services benefit package for the individual members or employees of the provider. This allows the individual members to benefit from the association with the large company for example, through reduced loan origination fees, real estate agency fees, attorneys fees and the like because of the special arrangement between the professional subscriber and the provider.

In the present embodiment, the professional subscriber can be a loan mortgage officer, a mortgage broker, a mortgage banker, an officer or employee at a credit union or bank, or any institution which offers real estate loans. The real estate loans themselves can be residential, commercial or a mix of the two.

In alternative embodiments, the professional subscriber can be a real estate agent, an insurance agent, a CPA, an attorney, an appraiser, a home inspector, a financial planner, a retirement planner or anyone who provides a specialized service to the general public, where the individuals working for say example the provider would benefit from a reduced fee arrangement between the subscribing professional and the providing company or entity.

In this present embodiment however, the subscribing professional provides real estate loans. As with any profession, navigating the mortgage loan process requires the aid of additional professional partners in related fields. These additional professional partners are generally strategically aligned with the mortgage banker or mortgage broker, and have a working relationship which will last over many years. Thus good working professional relationships can be valuable professional partners. These professional partners for real estate loans include real estate agents, insurance agents, certified public accountants, attorneys, real estate appraisers, home inspectors, financial planners, and other professional partners such as contractors, real estate development companies, architects, home designers, and the like.

A strong offering of professional services can be provided to the large company such as the employer or group association if the offering includes for example these allied professionals in a cohesive and comprehensive package. The present embodiment enables the professional subscriber to provide such a complete professional services offering package to a strategic decision maker such as a human resources officer or CEO in a large company or association and what we have termed provider, and execute effectively on this offering.

This strong offering makes it easy for the strategic decision maker to say yes to using the services. The provider then can offer the mortgage loan services and related affiliated services in a turnkey fashion to the individuals working or allied with the provider, and who wish to take advantage of such a real estate benefit package.

From the opposite end of the spectrum, or in other words the end-user perspective, the present embodiment generally makes the application process easier to accept and choose when a pre-negotiated discount price has been provided by the employer as a benefit to the employee. In other words, utilizing the intrinsic market power of groups, the employer can negotiate a more attractive loan services package for the benefit of the employees. Thus the employees do not have to become expert real estate loan applicants or know as much about the loan process or the mortgage business to find the best mortgage loan price.

Thus the present embodiment provides turnkey pre-negotiated loan service package with high-quality affiliated professional partners to efficiently provide a comprehensive loan services package to the employee thus enabling the employer to retain valuable employees because of the benefit package provided.

In order to implement such a system and method, various means of providing this subscriber application and beneficiary application are comprehended. The present system utilizes an active server page web site interface with an SQL server database and a web server running the application. The server makes available various client applications for the subscribing professional, the providing entity and the end-user or beneficiary.

While the present embodiment is provided utilizing web application interface format, other applications are comprehended. For example, instead of providing the service online, the service can be provided as a local intranet application for a mortgage brokerage company where the main application can be installed on the client computers connected to the company intranet, and the local applications can access the database run on the local intranet server. In its simplest format, the application can be run on a single computer or client, having a series of objects within the application containing the defined data. Such an application would be implemented through for example C++ software or other object oriented programming software applications. The applications for the end-user would be hard copy, and sent out by mail format instead of being provided online; information would then be input into the system by the professional subscriber such as the mortgage broker or his staff. Another conceivable application would be to have the end user beneficiary application provided on CD, and the loan application file then completed and sent via email to the subscribing professional's address, where the beneficiary application could be uploaded into the database and processed for loan completion through the subscribing application. Marketing materials and the like would then be provided through the large entity client provider in a mix of hard copy and digital format.

Nonetheless, the current embodiment utilizes a web-based application. A detailed description of the present embodiment will now be provided, first focusing on the system architecture and then discussing the method of use.

Referring first to FIG. 1, a system to provide a real estate loan benefit package 10 is shown. Here the web server 14 is connected through various means to the Internet 12 and provides interoperability with various client computers 16. As generally is known in the art, communication means 26 include cable, DSL, phone lines, satellite, and local intranet communication means. Accessible to the web server 14 are various large entities 24 such as banks, private employers, associations, groups, unions, governmental agencies, non-governmental agencies, educational facilities, and other entities which are formed having a membership base or employment base. The server 14 is accessible through various client computers 16 such as desktop computers, laptops, cell phones 18, personal digital assistants 20, and the like. Also interoperating with the Web server 14 are banks 22 and other financial institutions which need to have interoperability with the subscribing professional such as a mortgage broker when determining the credit worthiness or the approvability of the applicant's financial status for qualifying for the loan.

Figure 2:
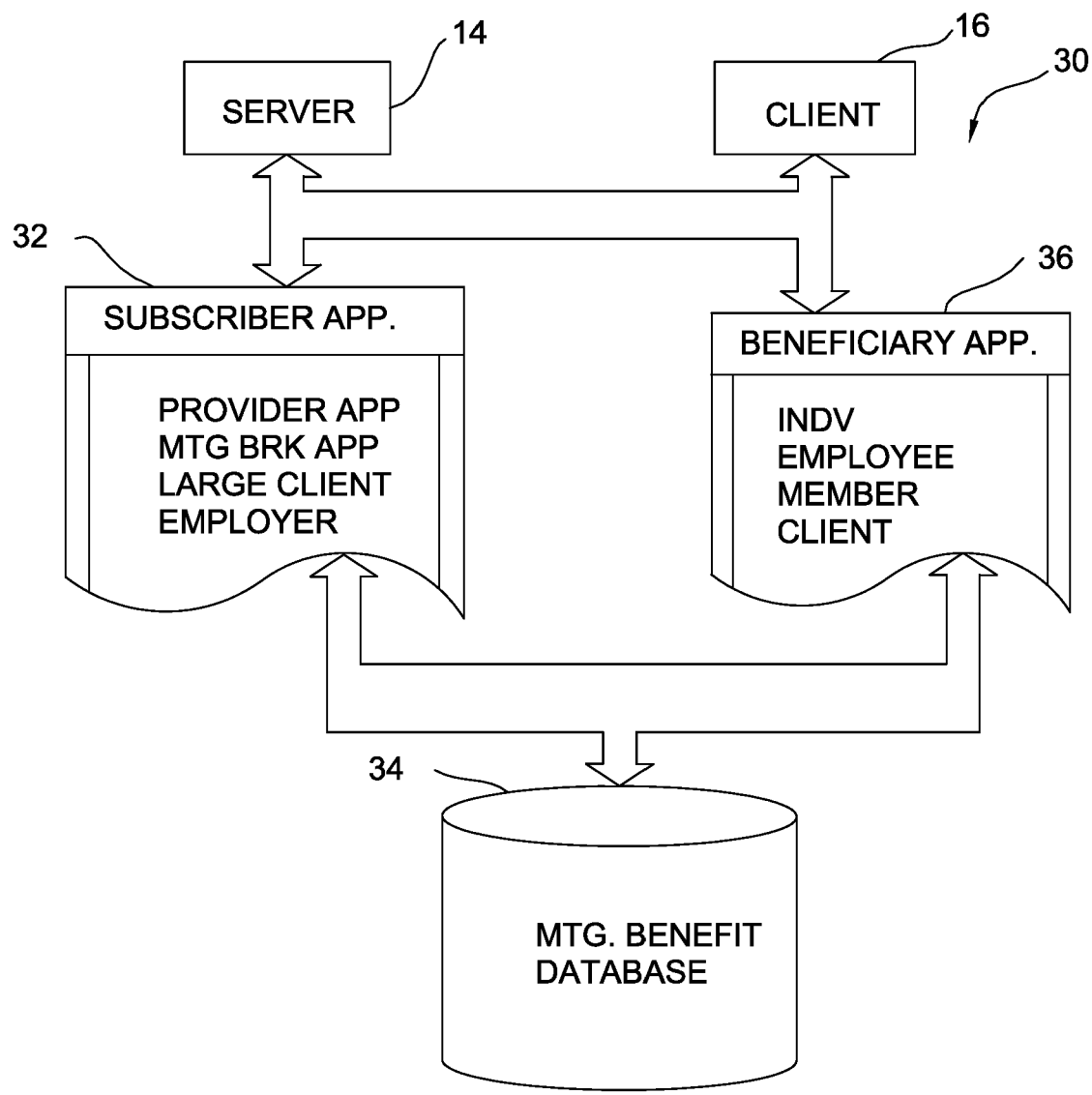
FIG. 2 is a schematic diagram of the real estate benefits system.

The majority of the discussion will be centered around the benefit package system 30 as seen in FIG. 2. Here the web server 14 interoperates with the various clients 16. Two main interfaces are provided and are distinguished based on the characterization of the user. There is what is termed a subscriber application 32 which is essentially a high level management application for the subscribing professional. This enables the subscribing professional such as the mortgage broker, mortgage banker, credit union, bank, or any institution that is offering a real estate loan to create and manage various real estate loan benefit package provider web sites for the various companies and entities previously discussed.

The second main interface is more of a hands-on user level interface which enables end users who have been given access or permission through their employers to access a beneficiary application 36 which enables the end user to apply for various real estate loan benefits such as a new real estate loan, a refinancing, home-equity loan, second mortgages and the like.

Both the subscriber application 32 and the beneficiary application 36 interoperate with a mortgage benefit database 34 which contains the information for the subscribers, the providers, the partners, and the various beneficiaries or employees. Also contained or hosted on the mortgage benefit database are various sets of marketing materials for the professional subscriber to utilize which will be discussed below.

Figure 3:
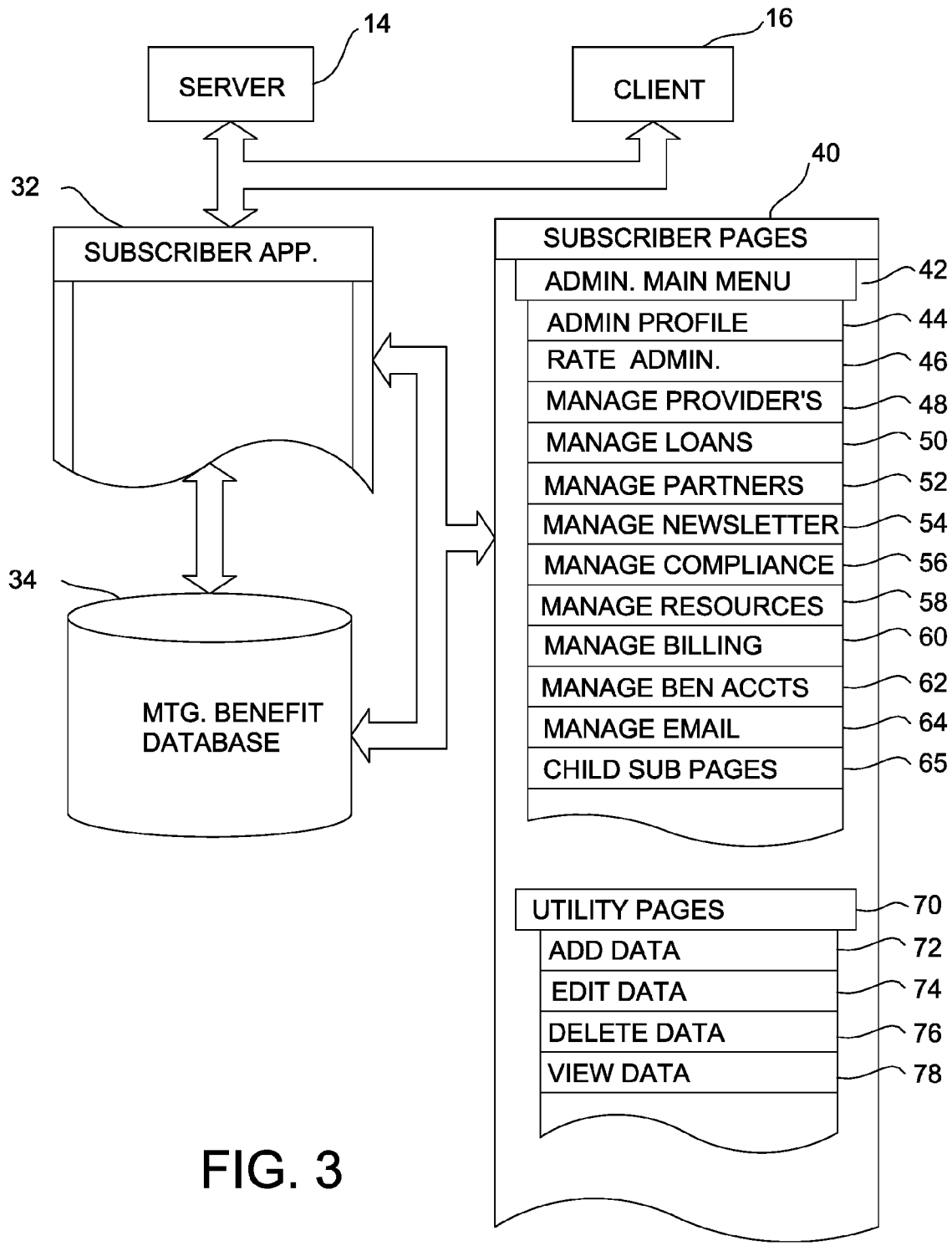
FIG. 3 is a schematic diagram of the subscriber application.

In order to provide the end user with a beneficiary application, the professional or mortgage broker using the subscriber application 32 must first team up with a desirable provider as well as partners. Referring to FIG. 3, a discussion of the subscriber application 32 and its various subscriber pages 40 will be provided.

A prospective subscriber will generally visit the homepage of the subscriber application 32 which is hosted on the web server 14. The homepage is provided through an instance of the subscriber page 40 and enables the prospective subscriber to review the information located on the subscriber application 32 including tools, products, pricing and the like. The prospective subscriber can review demos, review the company providing the subscriber application, contact the company, review an events calendar, as well as provide an e-mail to stay up-to-date on the various changes for the products and services within the mortgage industry. Also, existing subscribers can log in to their own accounts and then access the subscriber administration menu 42.

The subscriber application 32 accesses various subscriber pages 40 resident within the mortgage benefit database 34 to provide the various content for existing subscribers or existing beneficiaries. The subscriber pages 40 are essentially 11 collections or classes of objects including various object components accessible through the subscriber pages. These include an administration main menu component 42, an administration profile component 44, a rate administration component 46, a provider management component 48, a loan management components 50, a partner management component 52, a newsletter management component 54, compliance management component 56, resources management component 58, a billing management component 60, a beneficiary account management component 62, an e-mail management component 64, and child subscription pages management component 65. To provide some additional content functionality, various utility pages 70 include an add data component 72, edit data component 74, delete data component 76, and a view data component 78.

Figure 10:
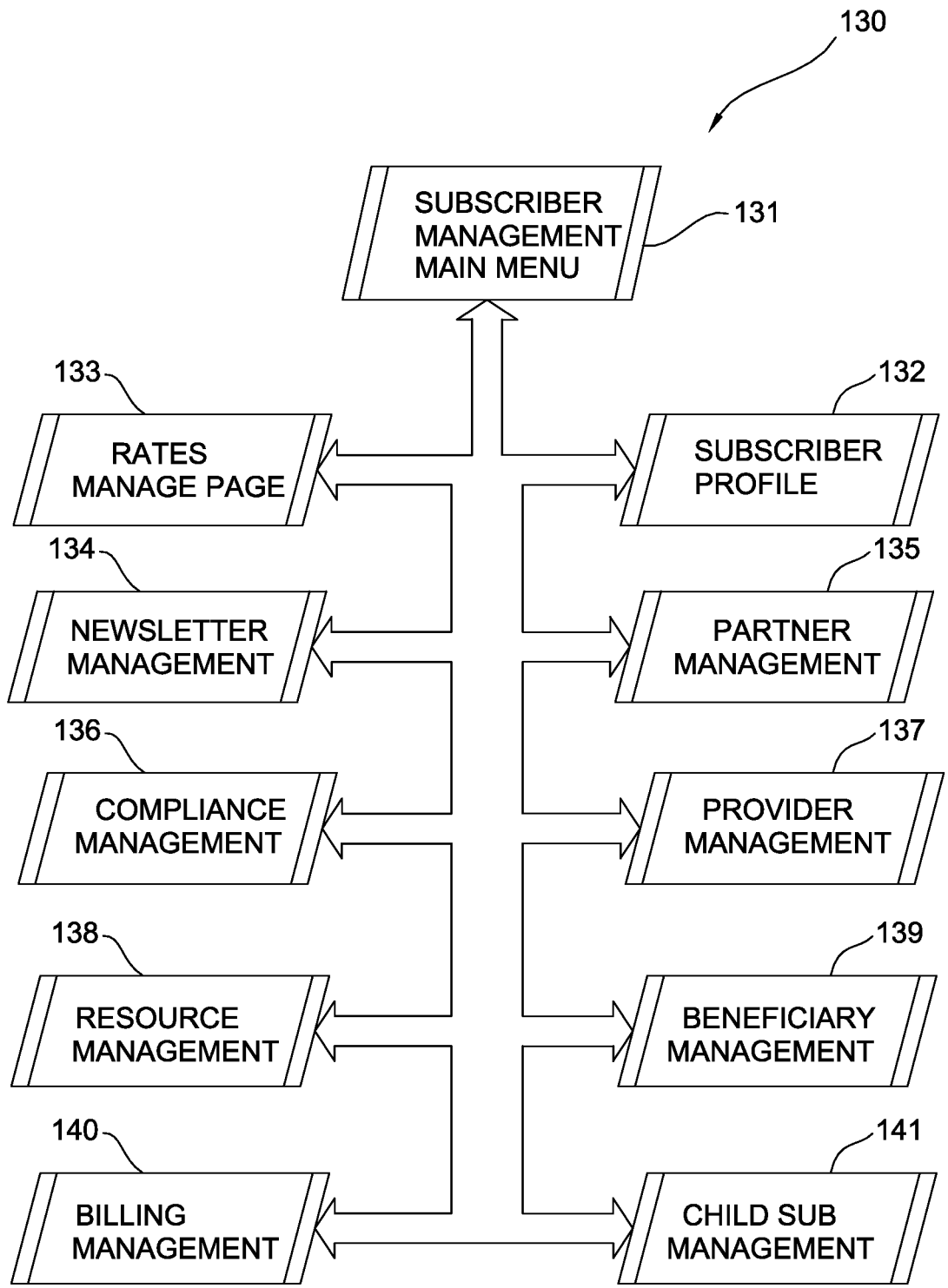
FIG. 10 is a schematic flowchart of the loan management process.

A detailed discussion of the above-mentioned components and/or pages, and their operations now be provided. Referring to FIGS. 3 and 10, once the prospective subscriber has obtained a creation ticket number from the company providing the subscriber application, the mortgage broker can create a new subscriber account. This begins the aggregation of the data into the subscriber administration profile component 44 resident in the DB 34. The prospective subscriber will enter various content information such as name, e-mail address, organization, address, phone information, as well as security information such as username and password. The prospective subscriber must agree to the terms of use of the subscriber application 32. Once the prospective subscriber has set up his first subscriber account, the prospective subscriber is now considered by the system a professional subscriber and can access the subscriber administration main menu component 42. This main menu component 42 offers access to the previously-mentioned subscriber component pages which enable the mortgage broker to bring together his cohesive real estate loan services provider team and market his services to the potential providers.

The main menu component is initialized as a subscriber management main menu page 131 as seen on FIG. 10. This main menu management page 131 is the main access for the subscribers account. Here the professional subscriber can customize his profile, add provider sites, set his loan rates, and manage the end-user beneficiary mortgage applications. Furthermore, the professional subscriber can add child subscriber management accounts. The child subscriber management accounts are particularly beneficial when the professional subscriber is not the originator of the loan but has loan originators working for the professional subscriber and who have various portfolios of organizational providers. As seen in FIG. 10, the subscriber main management page 131 enables the professional subscriber to orchestrate the loan management process 130.

All of the various subscriber components 40 as seen in FIG. 3 are initialized through the use in one form of a hyperlink from the subscriber management main menu page 131. For example, the subscriber administration profile component 44 can be accessed through the subscriber profile link which brings up an active server page of a subscriber profile page 132.

Figure 10A:
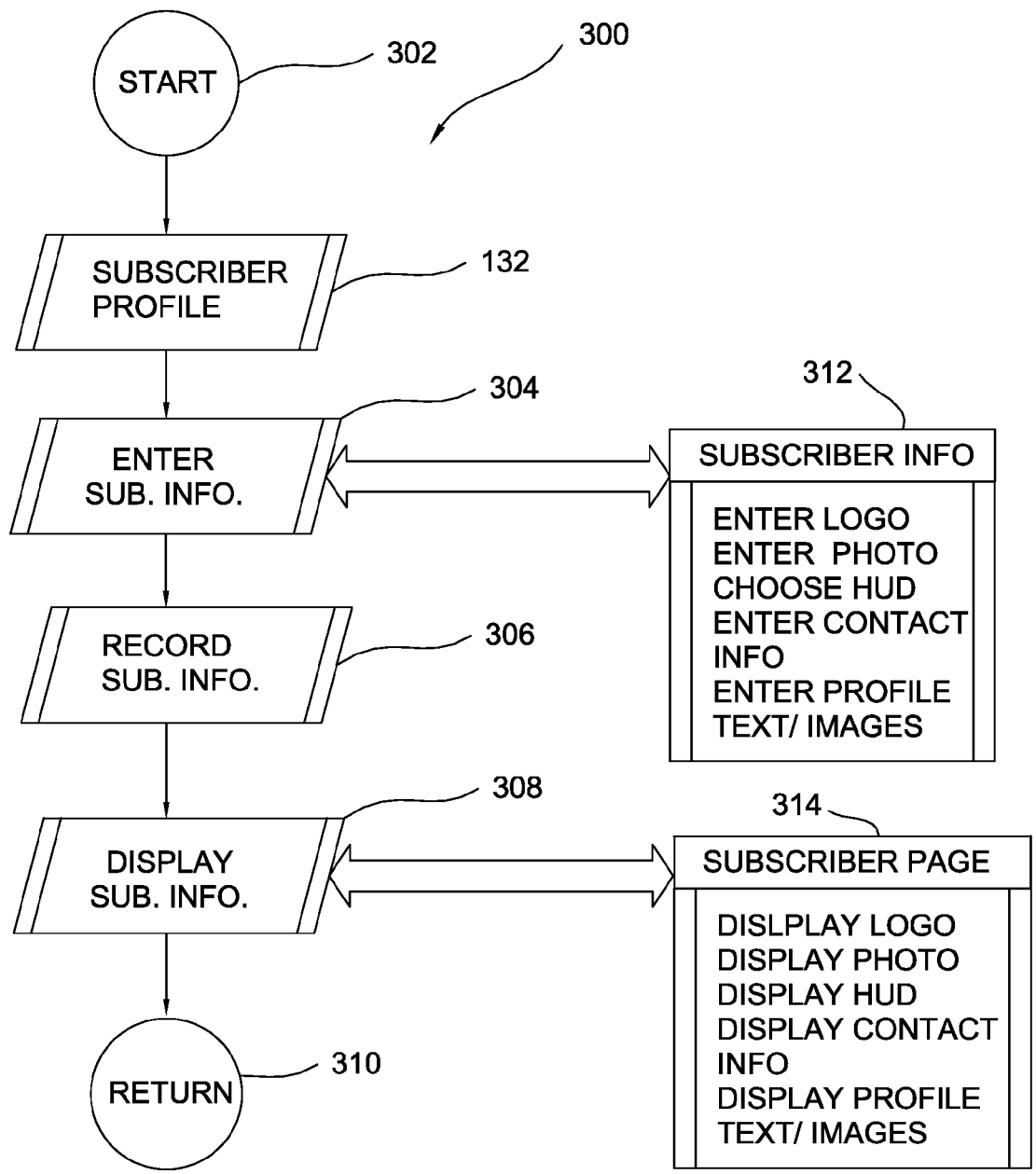
FIG. 10A is a schematic flowchart of the subscriber profile application process.

After accessing the subscriber profile page 132 as seen in FIG. 10A, the professional subscriber can begin the management of the subscriber application process 300. Starting at step 302, the professional subscriber will enter the subscriber profile page 132 and will be able to enter the subscriber information at step 304. This includes a subscriber information sub process 312 where the subscriber can enter his logo, his photo, choose a HUD icon if he is HUD compliant, enter his contact information, and enter any profile text or images. After exiting out of the subscriber info sub process 312, the subscriber can record this information at step 306 and then publish this information or display it at step 308 where the logo is displayed, his photo is displayed, and his HUD compliant affiliation is displayed and the contact information and profile or text/images displayed. After this the professional subscriber can return at step 310 to the subscriber management main menu page 131.

Along the same lines, the subscriber can set his rates by activating the rate administration component 46 as seen in FIG. 3 by initializing the hyperlink on the main menu to the rates manage page 133. Here the subscriber can set and edit the mortgage rates which the provider sites display on the provider home site page 164, FIG. 5.

The professional subscriber has the option of creating an e-mail newsletter which can be sent to the end users of the organization or provider. For example, the professional subscriber can access the subscriber management main menu page 131 and activate the newsletter management component 54 by initializing the newsletter management page 134 through the ASP scripting language. This brings up the various options, fields, and content which will be discussed later.

Still discussing the orchestration of the loan management process 130 by the professional subscriber, the user may wish to provide links to other industry professional parties such as real estate agents, insurance agents, financial planners, lending institutions, and other strategically aligned professional partners alluded to above. In order to do so, the professional subscriber again will access the subscriber management main menu page 131 and activate the partner management component 52 by initializing the partner management page 135 as seen in FIG. 10 through the current embodiment active server page.

Along the same lines, the professional subscriber can move between the partners management account 135 and the other pages through use of the subscriber management main menu 131 and which links together the components previously discussed in FIG. 3. For example, the compliance management page 136 as seen in FIG. 10 is initialized through the use of a hyperlink on the subscriber management main menu 131 which accesses the compliance management component 56 resident in the mortgage benefit database 34 as seen in FIG. 3.

The provider management page 137 enables the professional subscriber to generate, edit, and manage the customized site for each company or organization providing the real estate benefit package to the employees or end users of the benefit package. Here, the professional subscriber can access the subscriber management main menu page 131 as seen in FIG. 10, and initialize the provider management component 48 and initiate a provider management page 137 through the use of a hyperlink on the subscriber management main menu 131 as seen in FIG. 10 to create and manage the sites for each benefit package providing company or organization of which the professional subscriber has established a working relationship.

The subscribers also have need of users manuals for the subscriber application 32 as seen in FIG. 3, supply order forms as well as other useful information which helps them grow their loan management business. The subscriber management main menu page 131 as seen in FIG. 10 allows the professional subscriber to access the resource management component 58 and initialize a resource management page 130 as seen in FIG. 10.

With a successful working relationship between the loan benefit package provider and the professional subscriber, beneficiary applications must be managed. The beneficiary management page 139 enables the professional subscriber to create, view, and manage the mortgage applications submitted online by the users of the provider's sites. In one form, the professional subscriber will access the beneficiary account management component 62 by initializing the beneficiary management page 139 accessible link on the subscriber management main menu page 131. The professional subscriber will then be able to add, edit, delete, and view the end-user applications affiliated with the various organization providers.

For hosting and maintenance of the subscriber account, as well as for receiving payments from providers and/or end users, a billing management component 60 is provided and is accessible through the subscriber management main menu 131 which is initialized as a billing management page 140.

Figure 9:
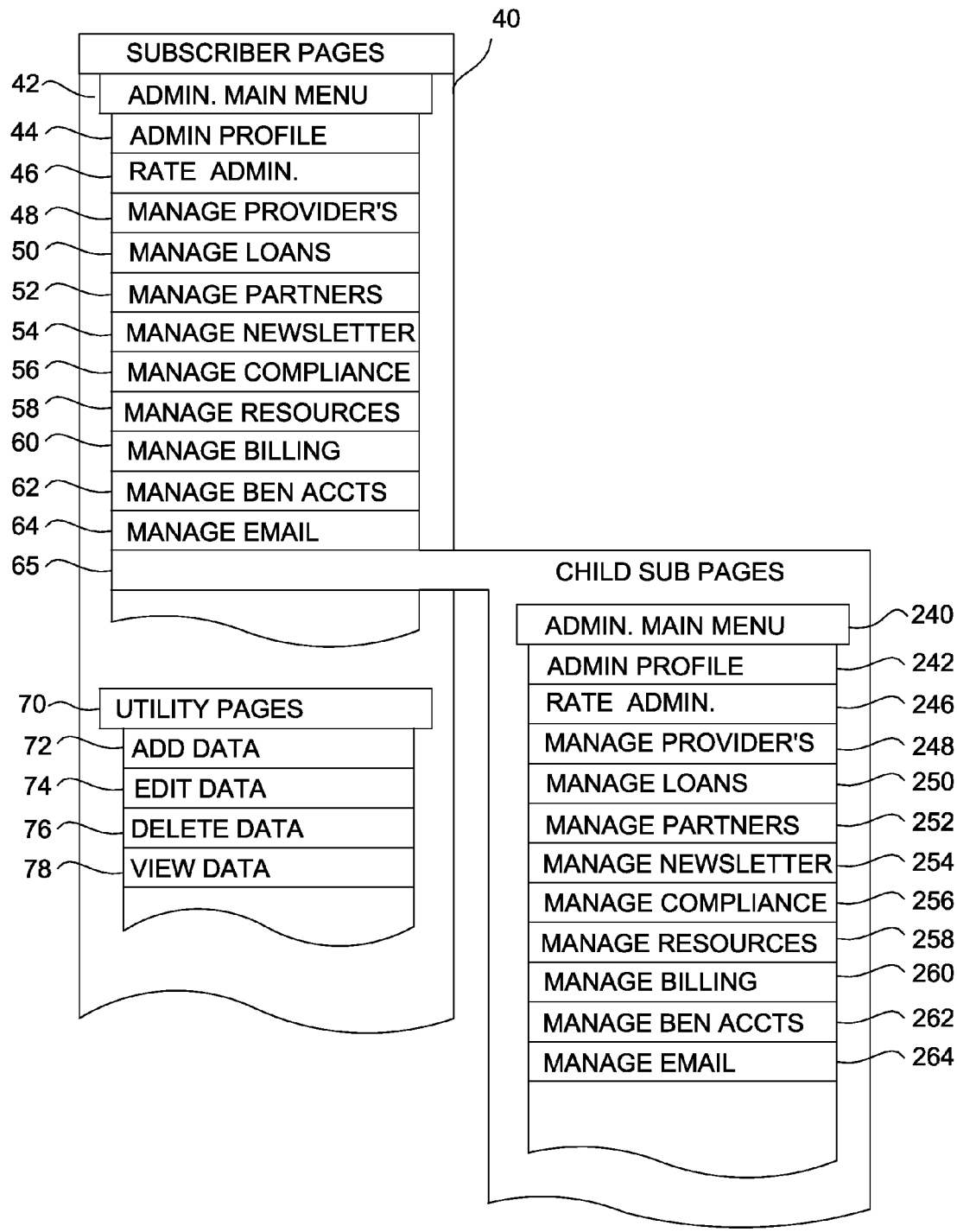
FIG. 9 is a schematic diagram of the child subscriber page component.

As mentioned above, the professional subscriber may have more than one employee working for his or her company, such as mortgage brokers or assistants and other loan originators. To effectively manage this operation, the professional subscriber can generate child subscription management sites which have the same set of useful components as the parent subscription application 32, FIG. 3. These include an administration main menu component 240 as seen in FIG. 9, an administration profile component 242, a rate administration component 246, a provider management component 248, a loan management component 250, a partner management component 252, a newsletter management component 254, a compliance management component 256, a resources management component 258, a billing management component 260, a beneficiary account management component 262, and an e-mail management component 264. One component not available is the ability to generate child subscription pages from this particular sub account package. This is not unforeseen though and can readily be implemented if desired.

An alternative embodiment includes enabling the professional subscriber to create and generate child subscription management pages 141 for the business operations of the professional partners working with the subscriber. For example, this might include providing the ability of the real estate agent partner to list properties either privately or through the MLS as part of the benefit package.

As alluded to above, at the opposite end of the spectrum, the end-user real estate loan benefit package owner will avail him or herself of the pre-negotiated loan service offered through his or her employer. Referring to FIG. 3, working in tandem with the subscriber application 32, the beneficiary account management component 62 and the beneficiary management page 139 as seen in FIG. 10, the beneficiary application 36 (FIG. 4) provides access to the benefit package application resident in the mortgage benefit database 34 created for the provider as a benefit for a preapproved end-user of the provider to access the beneficiary pages 80 which in one form starts at a beneficiary main menu page 82.

A detailed discussion of the beneficiary application 36, its class of beneficiary pages 80 as initialized through the beneficiary main menu component 82 and stored in the mortgage benefit database 34 will now be provided. The end user will generally receive the offering of the benefit package via e-mail as referenced by the providing organization. This will include in some cases a code or ticket number which the end-user can input into the signup or log in page as initialized through the login component 110. The login page will enable the end-user to establish a username, a password, answer an e-mail, create a secret question, and reenter their account once the registration has been completed.

Once the end user logs into the benefit package account, they will see a main menu benefit page which is initialized from the beneficiary main menu component 82. Here they have the option of starting a new loan application by initializing the apply for a loan application component 84, viewing an existing loan application by initializing the loan application component 86, applying for various types of loans such as refinancing, by initializing the refinancing component 88, utilizing various resources such as the calculator component 92 which in one form enables the user to calculate industry-specific ratios for loan approval. Also the user can check the offered rates available through the provider through the today's rates component 96. The user can obtain paperwork such as the good-faith estimate through the good-faith estimate component 102 after being approved for a particular loan amount. Also available are other resources such as the contacts component 100 enabling the end user to contact the professional partners listed and affiliated with the provider and the professional subscriber as previously mentioned and seen in the partner management page 135 (FIG. 10), as well as individual realtors 108. The end-user can do a compliance check 94 of the loan officer, as well as view the status of his application in the loan process 104 and the user can utilize various utility pages 112 including an add data component 114, edit data component 116, delete data component 118, and view data component 120.

With regard to the actual loan application component 86, the component enables the applicant or the subscribing professional to apply for various loan types and enter into fields various details which conform to standard industry real estate loan application or mortgage application. For example, the loan application component 86 will enable the user to apply for a conventional type loan and enter in a requested amount, for a term of years and request a particular interest rate with an amortization field. In addition to the specific loan type, property information can be entered for the purpose of the loan including addresses, type of property, loan purpose, and number of units etc. Also in the application is borrower information, including name, address, social security number, contact information, business address and mailing address as well as former addresses. If a co-borrower is aiding in the application process, the co-borrower information is also provided same as the applicant information. The borrower's employment information is also provided including the employer's name, the borrower's position/title, number of years on the job, the pretax monthly income, number of years in the profession, the employer's contact information including address. Additional employer information can be provided such as concurrent employers or past employers through the use of an employer component. In addition to employment income, other income is allowed to be inserted as a standard in the industry in a monthly fashion. After the income has been established, the monthly expenses such as rent, first mortgage payment, other financing, hazard insurance, real estate taxes, mortgage insurance, homeowner association dues and other housing expenses. The assets are then also entered into the equation including earnest money and life insurance, checking, savings, and stock accounts as well as properties owned such as automobiles and other personal property. Liabilities can also be entered into the equation such as creditor names, monthly payments and unpaid balances. Also, alimony and child-support maintenance if it exists can be entered into the application. In addition to the personal liabilities, real estate owned and the valuation of the existing real estate owned can be analyzed and entered into the application. Declarations can be answered as are required by the various reporting agencies such as credit approval agencies. Once the application has been completed, the user can save the application and forward it onto the professional subscriber for submission.

Figure 5:
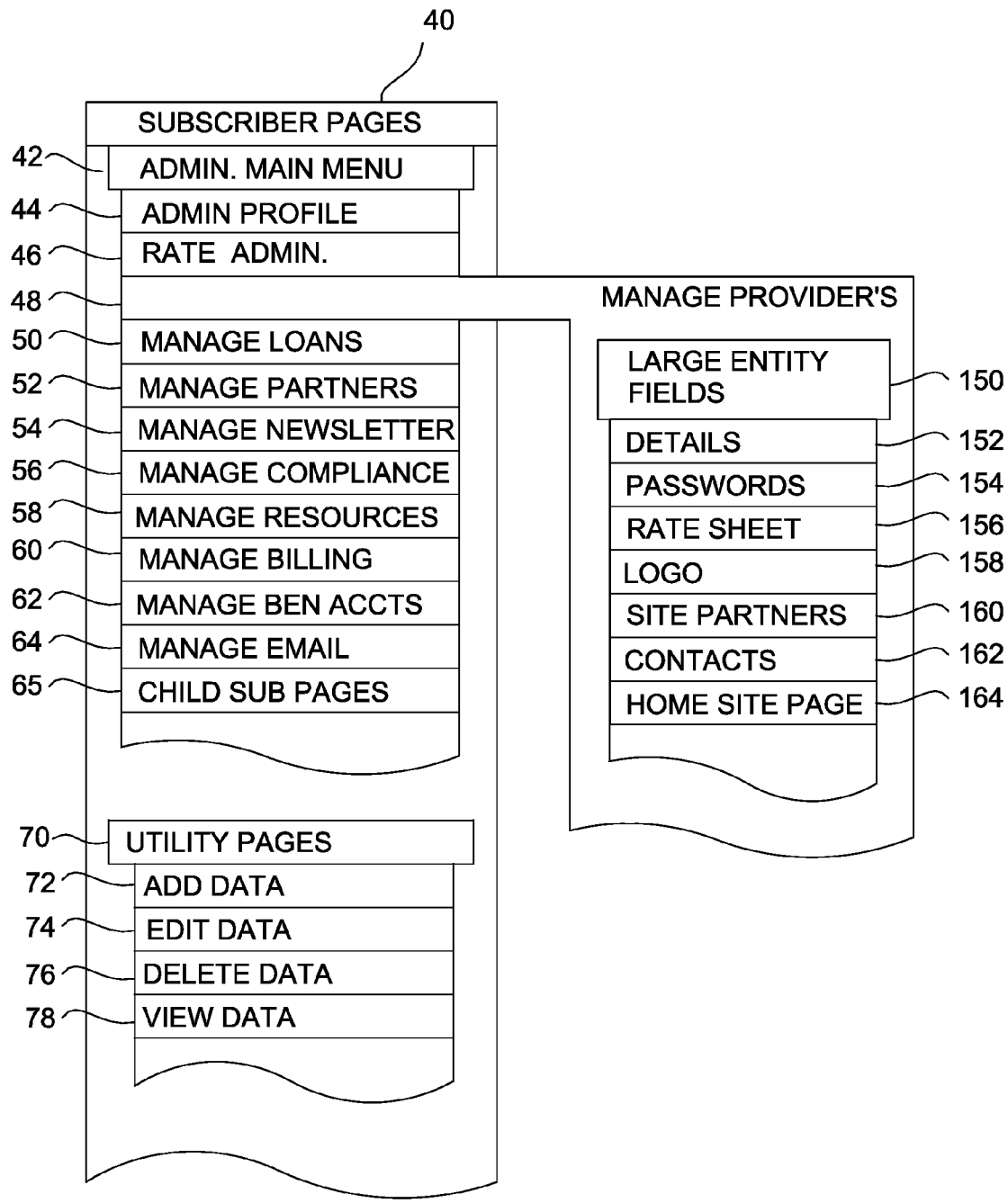
FIG. 5 is a schematic diagram of the provider management component.

Referring back to the subscriber application 32, a detailed discussion of some of the subscriber components and/or pages 40 will now be provided, first starting with the manage provider component 48 as seen in FIG. 5. The professional subscriber will want to establish and maintain the provider sites so that end users can login and create applications and modify the applications for their various benefit packages. In order to do so, the provider management component 48 has a plurality of provider sites 150 which represent the companies or organizations the personal subscriber has agreed to provide the real estate loan benefit package to the company's employees. When first establishing a provider site, the professional subscriber will prepare the provider site by entering in various organizational details. These include the provider details component 152 which includes the company name, number of employees, and other company specific data. Also the professional subscriber can set a password by enabling the password component 154 by setting a username and password. The professional partners which were added during the setup of the partner management page 135 as seen in FIG. 10, are available for inclusion on the provider's web site through the use of a partner site component 160 which has check boxes for including the partners who have agreed to provide some form of service in conjunction with the benefit package. In addition to the professional partners, a chosen set of rate sheets 156 can be provided based on the provider's preferences. A logo component 158 enables the professional subscriber to upload an image of the company logo for affiliation purposes. A contact component 162 enables the subscriber to list a primary site contact and a secondary site contact when the end users are viewing for contacting on the benefit package services. Also, a homepage site component 164 enables the subscriber to enter in customized text, images and tables for the final website presentation.

Figure 5A:
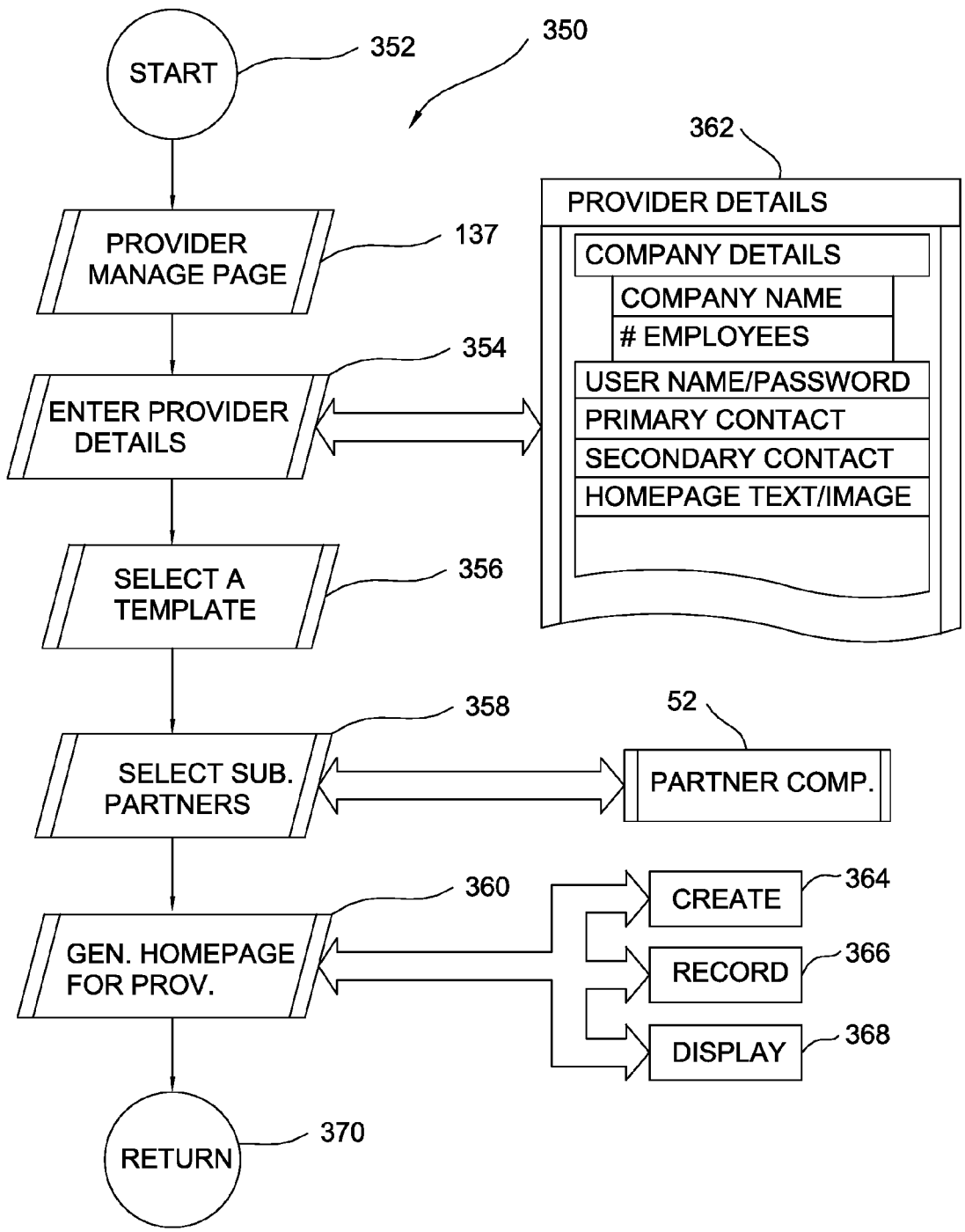
FIG. 5A is a schematic flowchart of the managing provider account process.

Referring now to FIG. 5A, the managing provider account process 350 includes first starting or accessing the provider management page 137 at step 352. The subscribing professional, upon viewing the provider management page 137, has the option of editing existing provider sites, deleting existing provider sites, or creating new provider sites. At step 354, the subscribing professional can enter provider details either by creating a new site or editing an existing site. This includes the provider details process 362 including entering in company details or revising company details; the company details including the company name as well as the number of employees. The subscriber professional will set up or edit an existing user name and password for control and/or access to the web site of the provider. Also in the provider details process 362, the subscribing professional will provide a primary contact and a secondary contact. The home page text and images are also configured during this process. After entering the provider details at step 354, the subscriber will select a template and rate sheet combination at step 356. Once the rate sheet and template are selected, the subscriber will choose subscriber partners at step 358, the list of partners being accessible through the subscriber component 52 as seen on FIGS. 3 and 6. The next step in the process is to generate a home page for the provider at step 360. This includes the creation step at 364 which includes aggregating all of the information and then recording it at step 366 on the database and then displaying the finished web site at step 368 as hosted on the web server. After the generation of the homepage for the provider has been completed, the subscriber with generally return at step 370 either to the main menu of the provider management page 137 or the subscriber management main menu page 131 as seen in FIG. 10.

Figure 6:
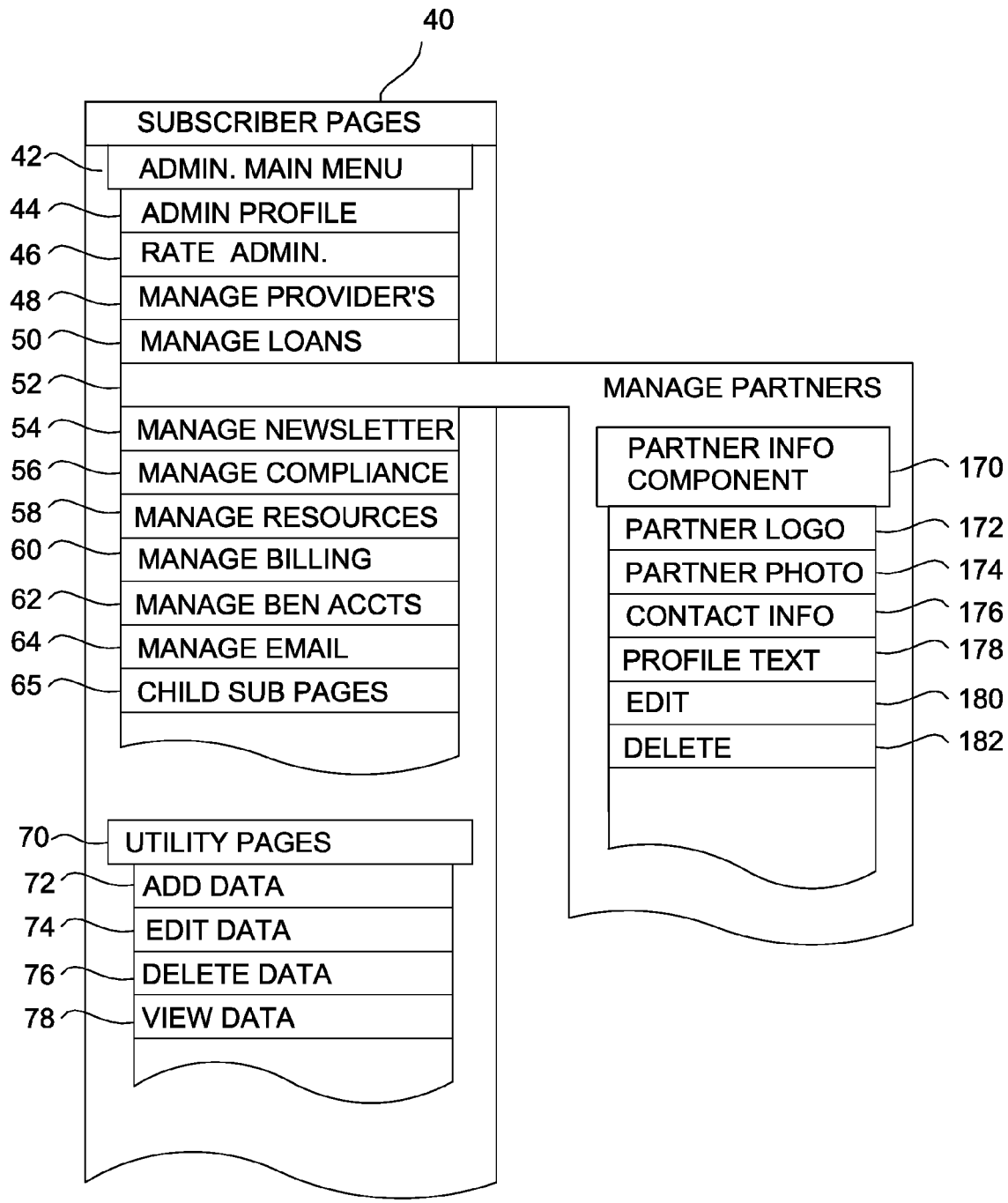
FIG. 6 is a schematic diagram of the partner management component.

Referring to FIG. 6, the subscribing professional will also wish to establish strategic partnerships with other related professionals in the field. For example, industry professionals may be able to offer a portion of the commission they would make from the deal as an incentive for the endorser applying for a loan through the beneficiary application due to reduced overhead costs. The industry professionals include previously-mentioned real estate agents, accountants, attorneys, home inspectors, insurance agents, financial planners, architects, contractors, developers, brokers, banks, credit unions etc. Depending on the provider being marketed to, the subscribing professional will wish to utilize a portion or all of the strategic partnerships which makes sense for the end users through the partner management page 135 (FIG. 10). There are four pieces of professional partner information which carry throughout the loan benefit system: they include the company logo for the professional partner as accessed and recorded in the partner logo component 172, the partner photo component 174, the partner contact information component 176, and the partners profile text component 178. The subscribing professional can modify, add and delete professional partners as desired.

Figure 7:
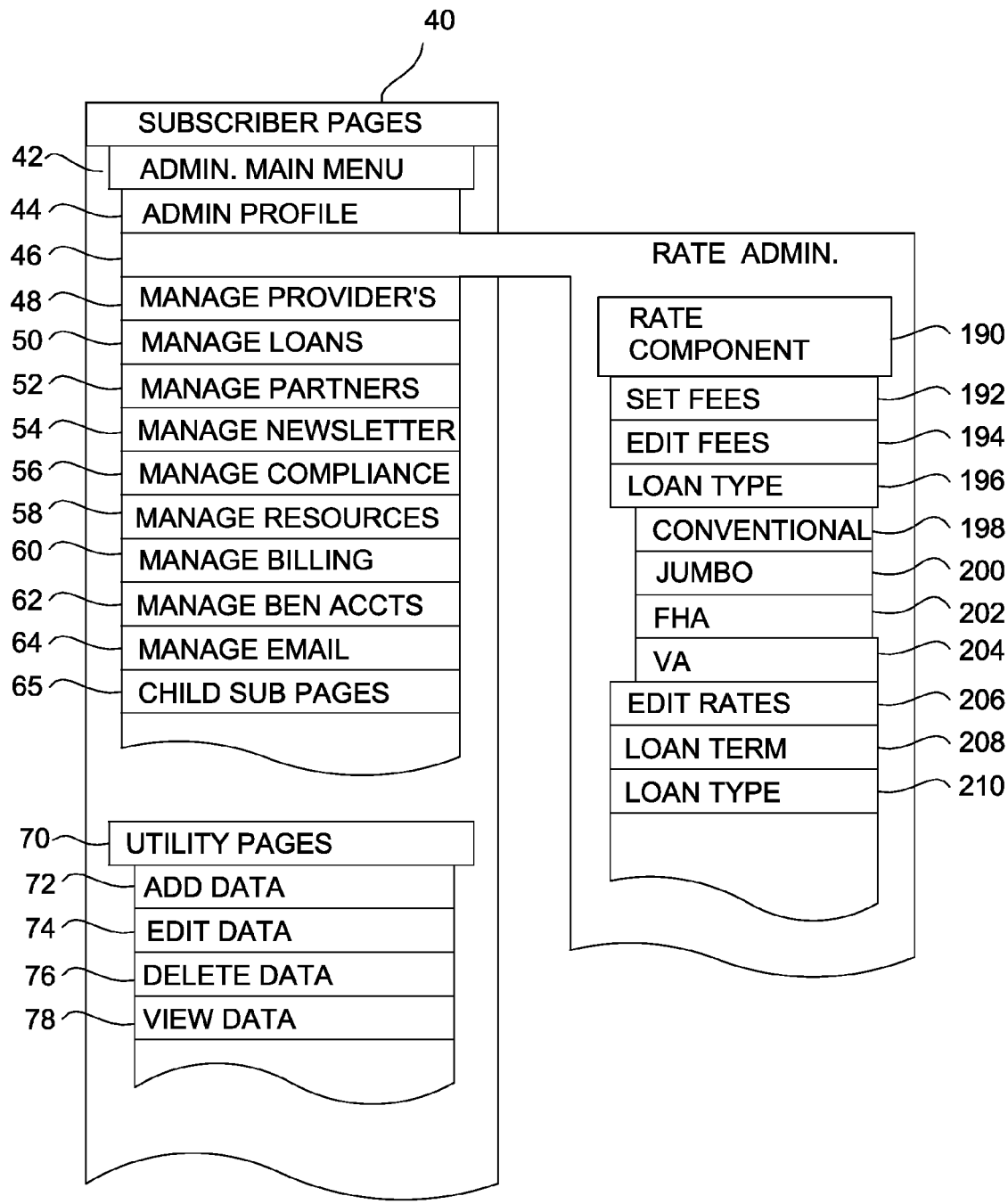
FIG. 7 is a schematic diagram of the rate administration component.
Figure 7A:
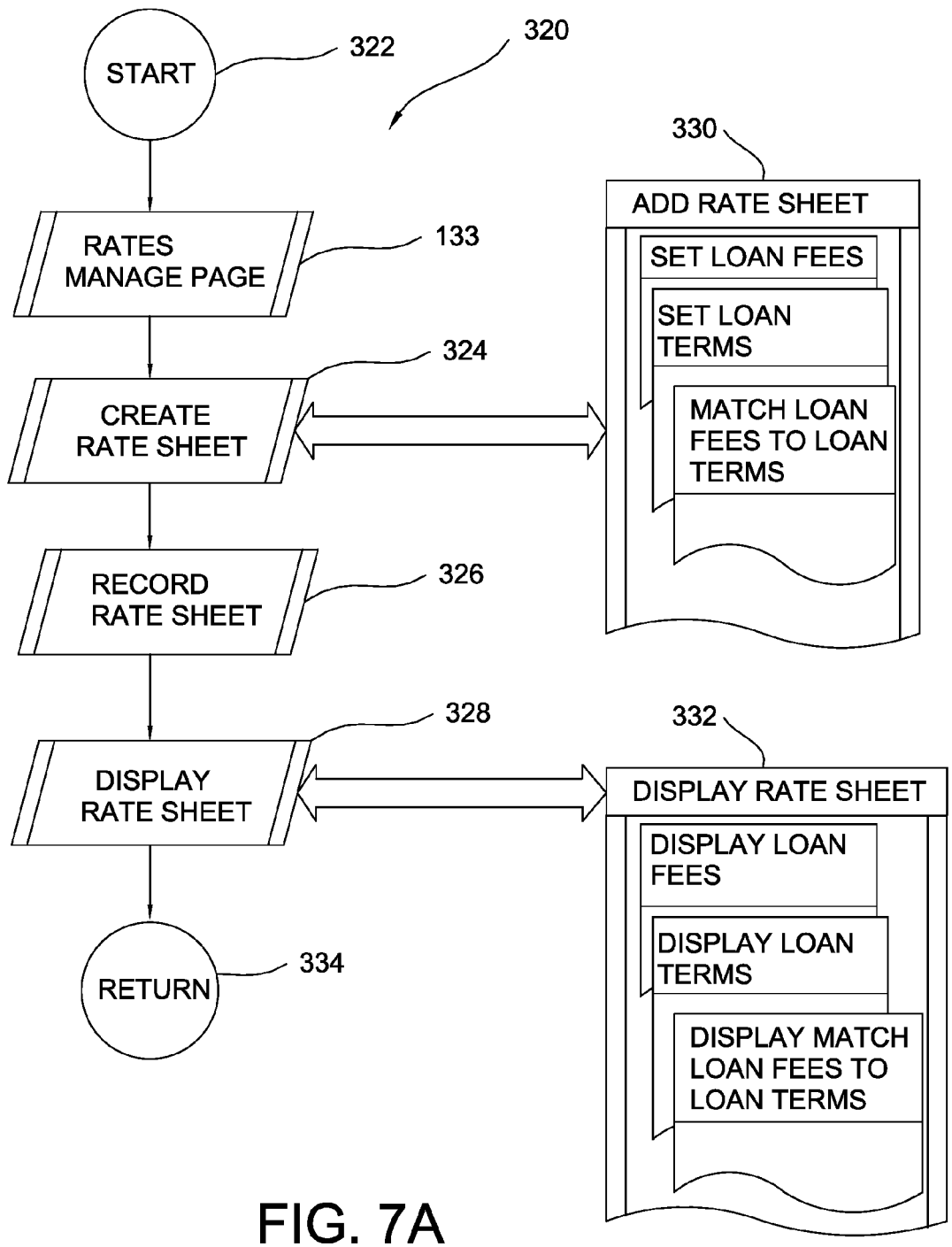
FIG. 7A is a schematic flowchart of the loan rate managing process.

Referring now to FIGS. 7 and 7A, the professional subscriber as a loan officer or a mortgage broker will want to set up various rate sheets on a daily, weekly, or monthly recurrence. The rate sheets can be set up for the end-user and can reflect the origination fee in points or dollars. Multiple rate sheets can be created and an APR calculator automatically calculates the average percentage rate for the particular rate sheet. This calculation meets with the federal law requirements for posting of rate sheets. The professional subscriber can manage the loan rates process 320 by accessing the rates manage page 133. This enables the professional subscriber to access the various rate administration components 46 and pages therein including a set fees component 192, an edit fees component 194, a loan type component 196, various types of loans such as but not exclusive to a conventional loan component 198, a jumbo loan component 200, an FHA loan component 202, and a VA loan component 204. Also contained within the rate administration component 46 are utility components for editing rates 206, determining a loan rate term 208, and determining a loan type 210. In order to create a rate sheet (step 324), the user will initiate the rate sheet process 330 and choose a sheet name and determine whether or not the fees shall be calculated in points or dollars. Once that is determined, the subscriber can set loan fees for a number of unique field characteristics; for example the jumbo loan includes an average loan amount, a lock period amount, an application fee amount, an assignment fee amount, city, state and county fees amounts, discount fees, document preparation fees, flood determination fees, prepaid interest fees, mortgage insurance premiums, processing fees, tax service fees, temporary buy down fees, underwriting fees, warehouse fees, wire fees, other miscellaneous lender fees, escrow/settlement/attorneys fees, notary fees, and other miscellaneous escrow/title fees. With the loan fees set, the subscriber can then set the loan terms which are basically the term of years that the loan will operate. These terms include a 30-year fixed term, a 15-year fixed, an option ARM, a one-year ARM, a 3/1 ARM, a 5/1 ARM, a 7/1 ARM, and a 10/1 ARM. After the term has been determined, the subscriber can match the loan fees to the loan terms and generate a loan program which is displayed within the rate sheets. This loan program is recorded in the rate sheet (step 326) and displayed as the final fully-indexed rate with the APR calculated. The professional subscriber then has the option of adding additional rate sheets or returning to the main menu.

Figure 4:
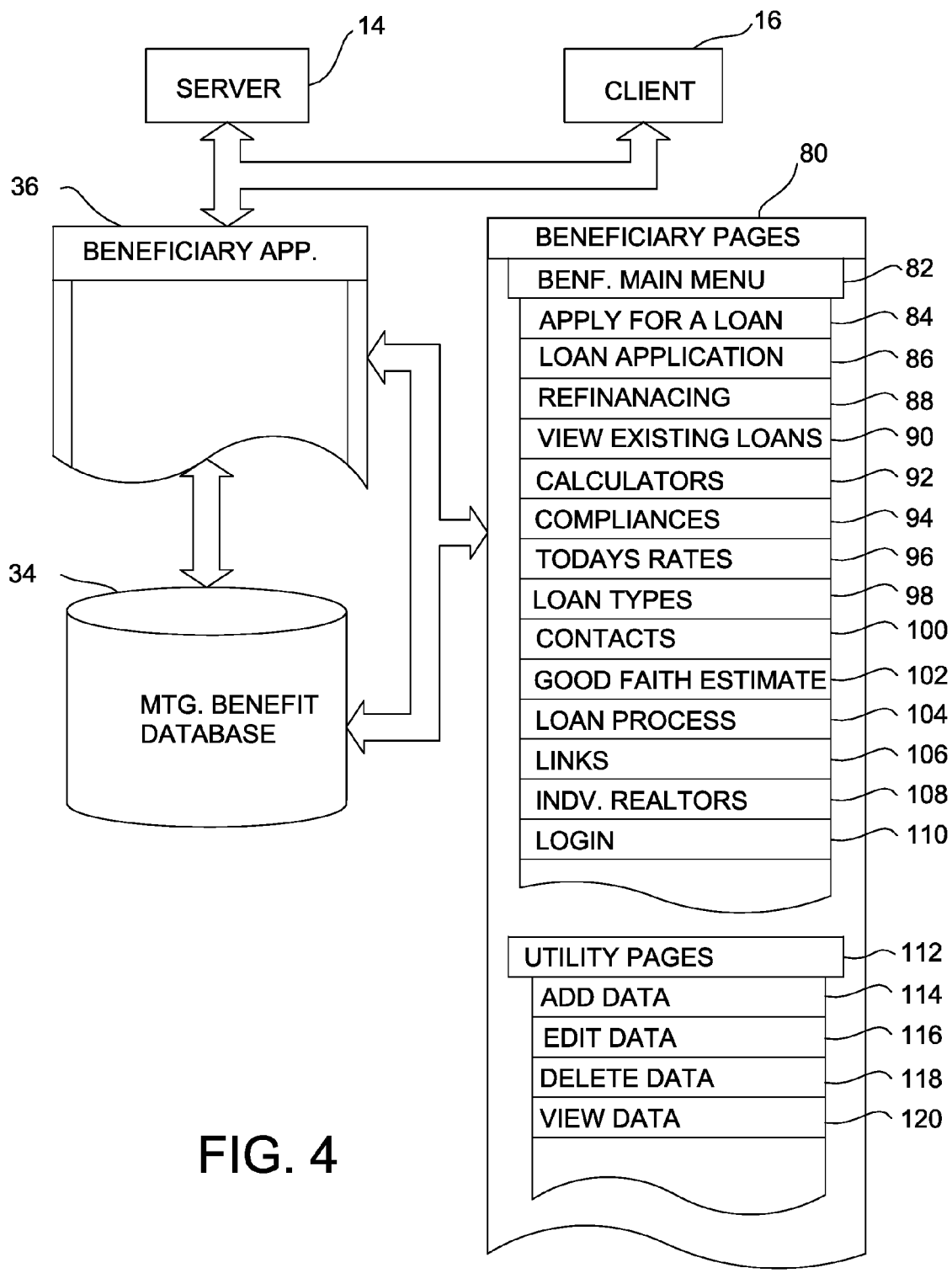
FIG. 4 is a schematic diagram of the beneficiary application.
Figure 8:
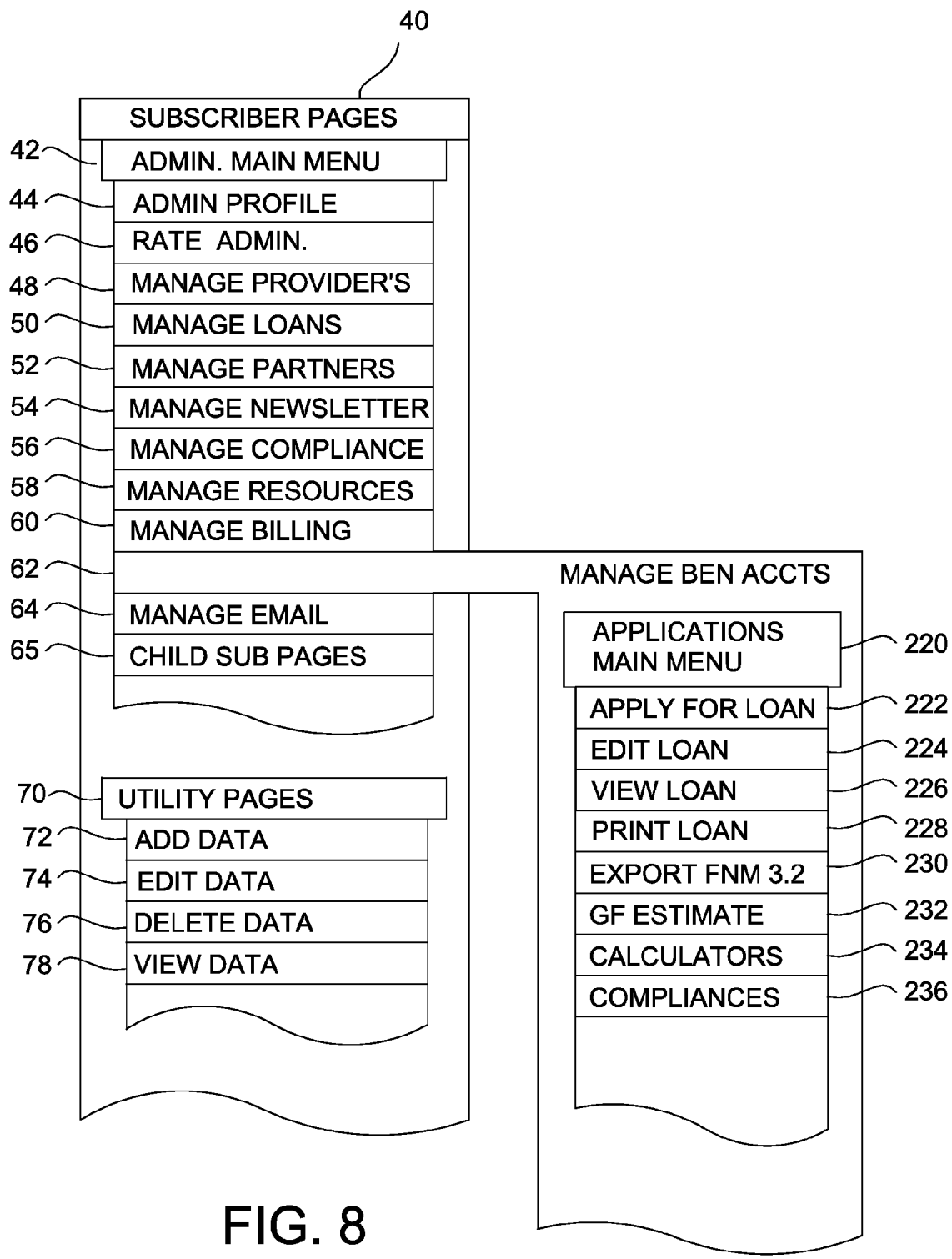
FIG. 8 is a schematic diagram of the beneficiary account management component.

One way for the final loan application to get into the system is for the end users to access the beneficiary application 36 as seen in FIG. 4, and utilize the various beneficiary pages 80 as previously discussed. After these applications and accounts have been established, or at least after the provider site has been created through the provider management page 137 as seen in FIG. 10, the subscribing professional can access and manage the applications through a beneficiary account management component 62 as seen in FIG. 8. Here a list of the existing applications are held and can be shown through the applications menu component 220. While it is generally preferable for the end-user to apply for a loan, the subscribing professional has the option of starting a loan application through the apply for a loan component 222 for a particular end-user. This is essentially the same loan application process as previously discussed through the use of the apply for a loan component 84 of the beneficiary pages 80 as seen in FIG. 4. The only difference is that the subscribing professional is accessing the loan application through the beneficiary account management component 62 or beneficiary management page 139 as seen in FIG. 10. Additional interoperability and tools which are available to the professional subscriber include a loan edit component 224, a loan view component 226, a print loan component 228, an export loan component 230, a good-faith estimate creation component 232, various calculator components 234 and compliances components 236. Also, the subscribing professional can utilize various utility tools such as an add data component 114 as seen in FIG. 4, an edit data component 116, a delete data component 118, and a view data component 120.

Figure 8A:
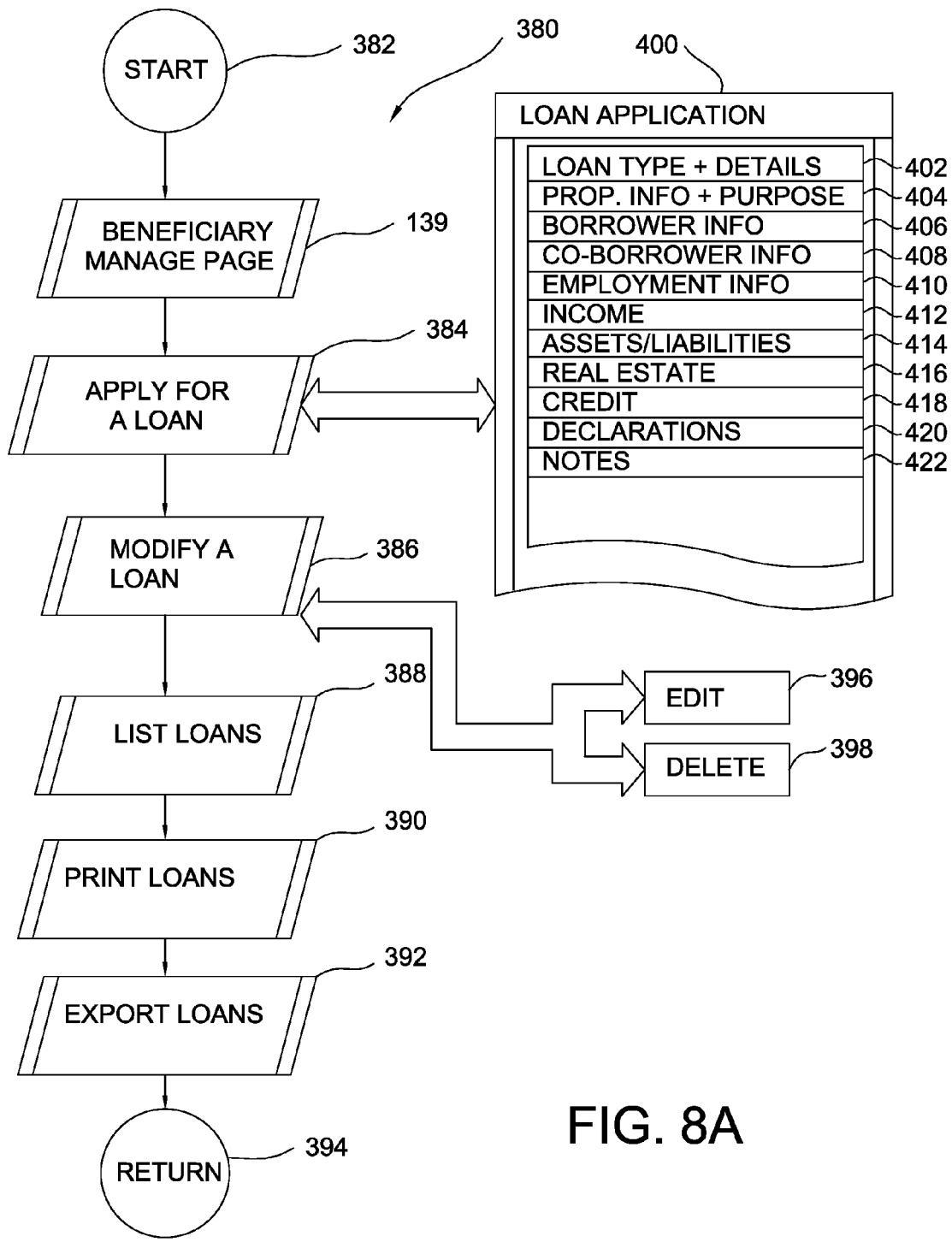
FIG. 8A is a schematic flowchart of the beneficiary management process.

Now referring to FIG. 8A and discussing the beneficiary management process 380, the professional subscriber will want to manage the various loan applications applied for by the end users or beneficiaries using the benefit package provided by their company or provider. In order to review, add, edit, or delete any of the existing loan applications, the subscribing professional will begin the beneficiary management process 380 at step 382 by accessing the beneficiary management page 139 (FIG. 10) and FIG. 8A. Various options are available to the subscribing professional including applying for a loan, editing an existing loan, viewing a loan, printing a loan, exporting a loan, approving or generating a good-faith estimate, performing various calculations, and providing compliances. In this current process, the subscribing professional will apply for a loan at step 384. This includes performing the loan application process 400 for a particular beneficiary end-user. The subscribing professional will enter in the loan type and details at step 402, enter the property information and purpose at step 404, the borrower information at step 406, the co-borrower information at step 408, the employment information at step 410, the income information at step 412, the assets and liabilities at step 414, the real estate owned by the end-user at step 416, the credit information at step 418, the declarations at step 420, and any notes at step 422. The user can then save this information or submit it for processing. After the loan application process at step 384 is complete, the subscribing professional can modify the existing loan or any other existing loan at step 386 by either editing at step 396 or deleting at step 398 any piece of information contained within the loan application. After any modifications have been completed at step 386, the subscribing professional can review the list of loan applications at step 388; at step 390 the professional subscriber can print any loan applications. At step 392, the loans can be exported for various purposes, and once the management process is complete, the subscribing professional can return to the main menu at step 394 at the subscriber management main menu page 131 (FIG. 10).

Figure 9A:
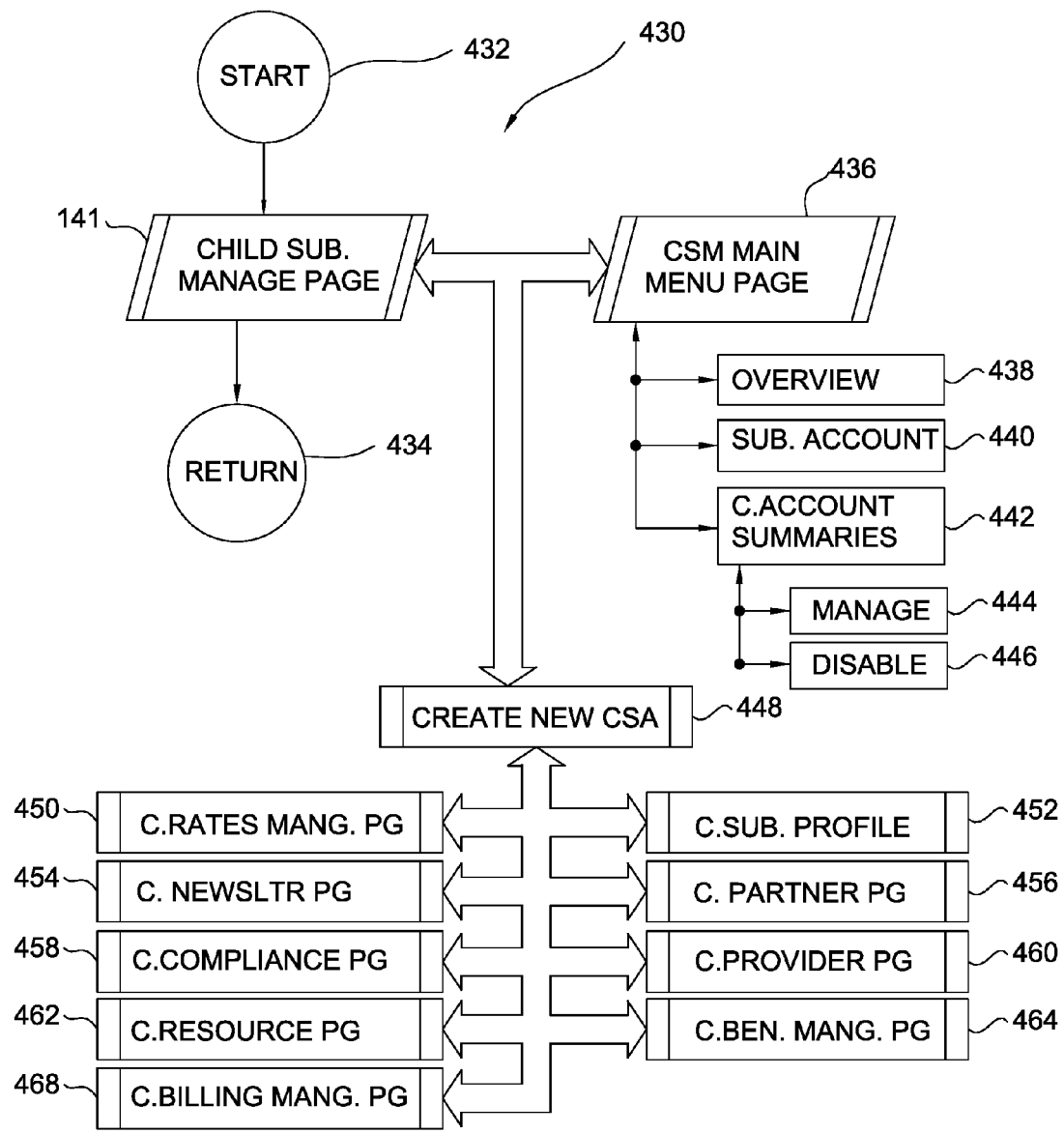
FIG. 9A is a schematic flowchart of the management child account process.

In a multiple user application, the professional subscriber will likely have need for adding and deleting loan originator accounts. These loan originator accounts as alluded to above are essentially child subscriber accounts enabling the loan originators to manage their own providers and beneficiary loan applications. Referring to FIGS. 9 and 9A, the professional subscriber will have need of managing these child subscription accounts and will generally set this up by performing a management child account process 430. The professional subscriber will initialize the child subscription management page 141 and start the process at step 432 from the subscriber management main menu, page 131 (FIG. 10). The child subscriber management page 141 is initialized from the mortgage benefit database 34 holding the child subscriber page component 65. An instance of the administration main menu component 240 will be initialized as a child subscription management main menu page 436. In this main management page, the professional subscriber can display the overview at step 438 of the child accounts, the total number of sites, total number of end users or employees, total number of applications, the current pipeline, and the year to date pipeline, and the total number of closed loans. Also on this child subscription management main menu page 436 is a summary listing of the professional subscriber's account at step 440. This essentially lists all of the providing organizations currently under the professional subscriber's accounts, the date created, the number of employees for each organizational provider, the number of logins, current pipeline for each site, the year-to-date pipeline, the lifetime pipeline, and the ability to change ownership meaning change the loan originator or professional subscriber manager.

In addition to the overview and the subscriber account summary, any and all child subscriber account summaries are displayed on the main menu page at step 442. The professional subscriber has the ability to manage these accounts at step 444 as well as disable the accounts at step 446.

Also within the management child account process 430 is the ability for the professional subscriber to create a new child subscription account at step 448. If initialized, the components for the child subscription pages are initialized. These components include, as seen in FIG. 9, the administration profile component 242, the rate administration component 246, the manage providers component 248, the loan management component 250, the partners management component 252, the newsletter management component 254, the compliance management component 206, the resources management component 258, the billing management component 260, the beneficiary accounts management component 262, and an e-mail management component 264. After these components are initialized, the child subscriber management pages are created including the child subscriber profile page 452, the child rates management page 450, the newsletter management page 454, the partner management page 456, the compliance management page 458, the provider management page 460, the child resource management page 462, the child beneficiary management page 464, and the child billing management phase page 460. The assigned loan originator or child subscription manager can now update the subscriber profile, establish rates, begin creating newsletter management procedures, establish strategic professional partners, manage their professional compliances, and begin to generate provider management home sites.

I claim:

1. A web server method for managing a benefit package, said method comprising:
   a. providing a first benefit database hosted on said web server for execution of a first parent subscriber web application (PSWA) configured for a subscriber providing a first set of professional services;
   b. generating from said first PSWA a first group of child subscriber web applications (CSWA's) for providing said first set of professional services;
   c. managing said first group of CSWAs through said first PSWA by enabling and disabling the operation of one or more of said first group of CSWAs;
   d. generating from each of said first PSWA and said first group of CSWAs:

i. a first parent provider web account configured by said first PSWA for a first large entity;
   ii. a first group of child provider web accounts configured by said first group of CSWAs for a first group of entities;
 e. generating from said first parent provider web account and said first group of child provider web accounts respectively:
   i. a first benefit client package offering said first set of professional services to a first end-user operating a client platform affiliated with said first large entity;
   ii. a first group of benefit client packages offering said first set of professional services to a first group of end users operating client platforms affiliated with said first group of entities.

2. The method according to claim 1 wherein said method further comprises: generating from said first parent subscriber web application a first group of partner services complementing said first set of professional services.

3. The method according to claim 2 wherein said first set of partner services further comprises: real estate agent services, insurance agent services, certified public accountant services, Attorney services, appraisal services, building inspection services, financial planning services, retirement planning services.

4. The method according to claim 1 wherein said first set of professional services further comprises: loan services configured for said subscriber further comprising a banker, a credit union representative, a loan originator.

5. The method according to claim 1 wherein said first set of professional services further comprises: real estate services configured for said subscriber further comprising a real estate broker, a real estate agent.

6. The method according to claim 1 wherein said first set of professional services further comprises: certified public accountant services configured for said subscriber further comprising a CPA.

7. The method according to the claim 1 wherein said first of professional services further comprises: financial planning services configured for said subscriber further comprising a professional financial planner.

8. The method according to claim 1 wherein said first of professional services further comprises: Attorney services configured for said subscriber further comprising an attorney.

9. The method according to claim 1 wherein said first set of professional services further comprises: retirement planning services configured for said subscriber further comprising a retirement planner.

10. The method according to claim 1 wherein said first set of professional services further comprises: appraisal services configured for said subscriber further comprising an appraiser.

11. The method according to claim 1 aren't said first of professional services further comprises: building inspection services configured for said subscriber further comprising a building inspector.

12. The method according to claim 1 wherein said first large entity further comprises: a corporation, an organization, a union, a group of affiliated individuals such as an association, governmental agencies, nongovernmental agency.

13. The method according to claim 1 wherein said method further comprises:
   a. managing said first group of CSWAs through said first parent subscriber web application by:
   b. providing an overview listing of said first group of child subscriber web applications;
   c. providing a summary of said first group of child provider web accounts configured for said first group of entities;
   d. enabling the generation of a new child subscriber web application;
   e. enabling the disabling from said first group of child subscriber web applications an existing child subscriber web application.

14. The method according to claim 13 wherein said managing licensing compliance of said subscriber further comprises: indicating said professional subscriber is one of the following: a mortgage banker, and mortgage broker, a real estate broker, real estate agent, an attorney, a licensed financial adviser, a certified public accountant, a licensed real estate appraiser, a licensed home inspector.

15. The method according to claim 1 wherein said method further comprises: managing licensing compliance of said subscriber providing said first of professional services.

16. The method according to claim 13 wherein said managing licensing compliance of said subscriber further comprises:
   a. indicating said user is a professional subscriber;
   b. choosing a jurisdiction from a list of jurisdictions wherein said professional subscriber is licensed;
   c. optionally entering the license number and jurisdiction for the professional subscriber.

17. The method according to the claim 1 wherein said method further comprises: managing subscriber billing information by: entering credit card information, recording credit card information, processing credit card information.

18. The method according to claim 1 wherein said method further comprises: managing subscriber resources by: providing a user's manual, supplying order forms, providing a success guide, providing membership cards for end users, providing business timelines, providing marketing scripts, providing introductory letters.

19. The method according to claim 1 wherein said method further comprises:
   a. creating a new end user benefit application;
   b. editing an existing end-user benefit application;
   c. deleting an existing end-user benefit application;
   d. listing a plurality of end-user benefit applications by category;
   e. exporting an existing end-user benefit application.

20. The method according to claim 1 wherein said method further comprises:
   a. creating partner information;
   b. listing partner information;
   c. editing partner information;
   d. deleting partner information.

21. The method according to claim 1 wherein said method further comprises:
   a. creating a newsletter template configured for said professional subscriber;
   b. entering a new article into said newsletter template;
   c. listing a plurality of articles previously provided by said professional subscriber;
   d. editing an existing article;
   e. providing a list of recipients for said newsletter.

22. The method according to claim 1 wherein said method further comprises: generating from said first parent subscriber web application a first group of partner services complementing said first set of professional services.

* * * * *